(12) United States Patent
Auch

(10) Patent No.: US 10,682,985 B2
(45) Date of Patent: Jun. 16, 2020

(54) WIPER

(71) Applicant: Dr. Ing. h.c. F. Porsche Aktiengesellschaft, Stuttgart (DE)

(72) Inventor: Sven Auch, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 101 days.

(21) Appl. No.: 16/001,149

(22) Filed: Jun. 6, 2018

(65) Prior Publication Data

US 2018/0370492 A1 Dec. 27, 2018

(30) Foreign Application Priority Data

Jun. 21, 2017 (DE) .......................... 10 2017 113 632

(51) Int. Cl.

| B60S 1/34 | (2006.01) |
|---|---|
| B60S 1/04 | (2006.01) |
| B60S 1/08 | (2006.01) |
| B60S 1/58 | (2006.01) |

(52) U.S. Cl.
CPC ........... *B60S 1/3429* (2013.01); *B60S 1/0433* (2013.01); *B60S 1/08* (2013.01); *B60S 1/3413* (2013.01); *B60S 1/3456* (2013.01); *B60S 1/3475* (2013.01); *B60S 1/3479* (2013.01); *B60S 1/3484* (2013.01); *B60S 1/349* (2013.01); *B60S 1/583* (2013.01)

(58) Field of Classification Search
CPC .... B60S 1/3427; B60S 1/3429; B60S 1/3431; B60S 1/34; B60S 1/3413; B60S 1/3484; B60S 1/3475; B60S 1/3479; B60S 1/3481; B60S 1/3456; B60S 1/583

USPC ...................................... 15/250.351, 250.352
See application file for complete search history.

(56) References Cited

U.S. PATENT DOCUMENTS

| 2,722,708 A | * | 11/1955 | Parkes .................. B60S 1/3475 |
|---|---|---|---|
| | | | 15/250.34 |
| 2,838,782 A | * | 6/1958 | Wallis ..................... B60S 1/345 |
| | | | 15/250.352 |
| 5,566,419 A | * | 10/1996 | Zhou ........................ B60S 1/32 |
| | | | 15/250.34 |

(Continued)

FOREIGN PATENT DOCUMENTS

| DE | 10 2012 112 526 | | 6/2014 |
|---|---|---|---|
| FR | 1117392 | * | 5/1956 |

OTHER PUBLICATIONS

German Search Report dated Jan. 16, 2018.

*Primary Examiner* — Gary K. Graham
(74) *Attorney, Agent, or Firm* — Gerald E. Hespos; Michael J. Porco; Matthew T. Hespos

(57) ABSTRACT

A wiper (14) for wiping a window pane (12) of a motor vehicle is provided, having a drive shaft (16) that can be driven by a motor, and a wiper lever (18) connected to the drive shaft (16) for moving a wiper blade. The wiper lever (18) is flexibly bendable. A maximum bending angle (20) of the wiper lever (18) around a bending axis extending perpendicular to the drive shaft (16) is limited by a limit stop (32) to bending of the wiper lever (18) in the range of elastic deformation. The limit stop (32) makes stop contact at the maximum bending angle (20) and can keep the deformation of the wiper lever (18) reliably in the range of elastic deformation, thus reducing the risk of damage to wipers (14).

10 Claims, 1 Drawing Sheet

(56) References Cited

U.S. PATENT DOCUMENTS 9,393,934 B2 * 7/2016 Boland ................ B60S 1/3436
2016/0193985 A1 7/2016 Auch

* cited by examiner

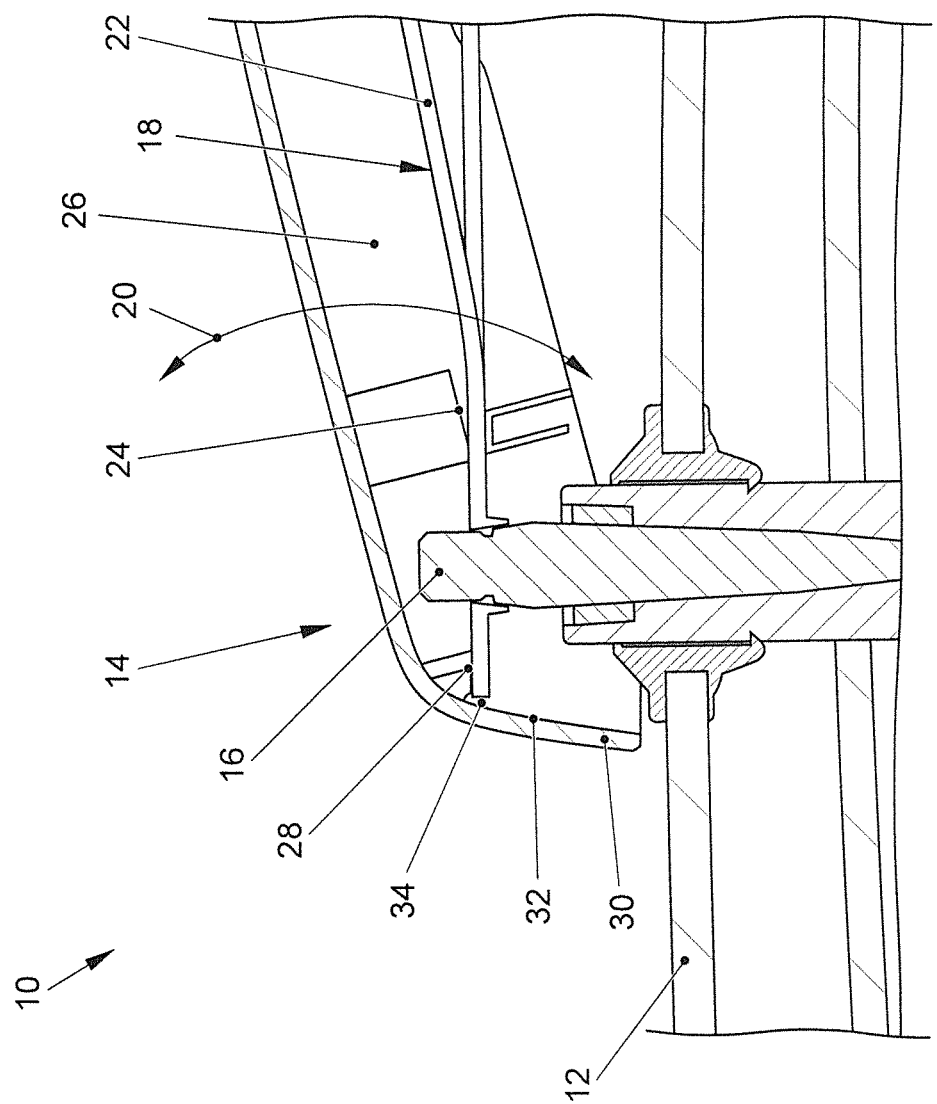

WIPER

CROSS REFERENCE TO RELATED APPLICATION

This application claims priority under 35 USC 119 to German Patent Appl. No. 10 2017 113 632.0 filed on Jun. 21, 2017, the entire disclosure of which is incorporated herein by reference.

BACKGROUND

Field of the Invention

The invention relates to a wiper, with the aid of which a window pane of a motor vehicle can be wiped.

Description of the Related Art

DE 10 2012 112 526 A1 discloses a wiper for wiping a window pane of a motor vehicle. This known wiper has a wiper lever for moving a wiper blade. The wiper lever is connected to a drive shaft that can be driven by a motor. The wiper lever is flexibly bendable to enable the wiper lever to be bent away from the window pane, e.g. to change the wiper blade.

It is an object of the invention to reduce the risk of damage to wipers.

SUMMARY

The invention relates to a wiper for wiping a window pane of a motor vehicle. The wiper has a drive shaft that can be driven by a motor and a wiper lever that is connected to the drive shaft for the moving a wiper blade. The wiper lever is flexibly bendable configuration. However, a limit stop limits a maximum bending angle of the wiper lever around a bending axis that extends perpendicular to the drive shaft so that the wiper lever can bend only in a range of elastic deformation.

The bendable wiper lever can be bent away from the window pane, to enable the wiper blade to be exchanged easily, for example. At the same time, it is possible for the wiper lever to provide a preload, so that a wiping lip of the wiper blade can be pressed against the window pane to achieve an optimum wiping result when wiping. The wiper lever can bent away from the window pane by hand through a bending angle and against an elastic prestress provided by the preload. However, an excessive force could result in plastic deformation of the wiper lever or even snapping of the wiper lever. A plastic deformation of the wiper lever away from the window pane could reduce or eliminate a preload of the wiper against the window. As a result dirt, raindrops and the like may no longer be wiped away adequately by the wiper.

However, the limit stop provides a haptically perceptible resistance that arises suddenly when the predefined maximum bending angle is reached and blocks or at least significantly hinders further bending of the wiper lever. This sudden resistance indicates that further bending of the wiper lever is not envisaged and therefore a person bending the wiper lever is warned intuitively not to bend the wiper lever further. Here, the stop contact of the limit stop takes place at a deformation of the wiper lever at which only elastic deformation has occurred, but plastic deformation has not yet occurred. Therefore, damage to the wiper due to plastic deformation of the wiper lever is avoided. The limit stop makes stop contact at the maximum bending angle and can keep the deformation of the wiper lever reliably in the range of elastic deformation to reduce the risk of damage to wipers.

Elastic deformation of the wiper lever can cause the deformed part of the wiper lever to strike against the limit stop and/or can cause the limit stop connected to the elastically deformed part of the wiper lever to strike against an undeformed component. In particular, the limit stop can strike against a counterstop at a maximum permissible bending angle. The position and dimension of the limit stop relative to the associated counterstop takes into account elastic deformations that take place during the bending of the wiper lever. The position of the limit stop relative to an associated counterstop in a starting position in which the wiper lever is not bent and the wiper blade is pressed against the window pane may be dimensioned with sufficient allowance to ensure that the wiper blade cannot be bent into the range of plastic deformation. In particular, position tolerances and/or manufacturing tolerances and/or assembly tolerances may be taken into account in this relative position. A stroke movement of the limit stop relative to the counterstop can be limited to a distance that keeps the deformation of the wiper lever reliably in the range of elastic deformation, taking into account all the tolerances and deformations. At the same time, the distance between the limit stop and the counterstop can allow sufficient bending of the wiper lever away from the window pane to replace the wiper blade. In particular, the wiper lever is produced from a metallic material, such as steel, and ensures that the wiper lever can provide sufficient elastic deformation to the point where an elastic limit $R_e$ is reached. In other respects, the wiper can be embodied as described in DE 10 2012 112 526 A1, the content of which is hereby incorporated by reference.

A rear region of the wiper lever that faces away from the wiper blade may project from the drive shaft to form a counterstop for the limit stop. The wiper lever can be connected firmly to the drive shaft to allow clamping at the fastening point of the wiper lever to the drive shaft. Bending moments during a bending out of the wiper lever can be supported via the drive shaft. Accordingly, the rear region of the wiper lever that projects beyond the axis of the drive shaft from that region of the wiper lever which can be bent out, remains immovable during any elastic bending of the wiper lever. As a result, a limit stop coupled in terms of movement to that region of the wiper lever that can be bent out always performs a movement relative to the rear region of the wiper lever during elastic deformation of the wiper lever, thus allowing this relative movement to be used to limit the elastic bending of the wiper lever. As a result, the limit stop can strike against the rear region and block further bending when the maximum bending angle is reached. In this arrangement, the axis of the drive shaft extends between the rear region of the wiper lever and the rest of the wiper lever. The wiper lever is not connected firmly to the drive shaft at the end of the wiper lever, but at a point offset from the end, and therefore the rear region of the wiper lever can project from the drive shaft at the end facing away from the wiper blade.

A cover may be connected to the wiper lever for covering the wiper lever. The cover can be provided to improve the aerodynamic properties of the wiper lever and to avoid an unnecessarily high flow resistance. Moreover, the cover can improve the optical appearance of the wiper. The cover may form the limit stop. More particularly, the cover can be connected to the wiper lever in terms of movement so that the cover follows the elastic bending of the wiper lever and, as a result, performs a movement relative to a fixed component. This relative movement can be used to enable the limit stop formed by the cover to strike against a suitable counterstop when the maximum bending angle is reached. The cover can be produced by injection molding of plastic and hence there is greater freedom in the shaping of the cover than there is with respect to the wiper lever. Therefore it can be easier to form the limit stop by means of the cover.

The cover may be secured on a bending region of the wiper lever that can be bent out elastically. As a result, the cover is coupled in terms of movement to the bending region of the wiper lever and can follow the bending movement. It is not necessary for the wiper lever to strike against a fixed limit stop of the cover to block further bending. Instead, the limit stop of the cover can strike against almost any fixed component serving as a counterstop. This opens up design choices for limiting the maximum bending of the wiper lever.

The limit stop of the cover may be configured to make stop contact with a region of the wiper lever that does not participate in the bending. The wiper lever can be connected firmly to the drive shaft so that at least part of the wiper lever remains immovable and is not bent as the wiper lever is bent away from the window pane. This makes it possible for part of the wiper lever to perform a movement relative to another part of the wiper lever during the process of bending out along the bending angle. This relative movement within the wiper lever can be used to provide a counterstop formed on the wiper lever itself for the limit stop of the cover. The number of components can thereby be kept small. Moreover, an unnecessarily long tolerance chain due to a plurality of interposed components can be avoided.

The limit stop of the cover may be configured to make stop contact with the drive shaft and/or an underlying surface. The drive shaft and the underlying surface, which may be formed by the window pane and/or by a part of the motor vehicle body that frames the window pane, form an immovable component relative to which a movement can take place through the bending of the wiper lever together with the cover. As a result, a counterstop for the limit stop can be formed by the drive shaft and/or by the underlying surface. The counterstop of the drive shaft and/or of the underlying surface can be a substitute stop that is only used if a counterstop, formed by the wiper lever for the limit stop of the cover has failed and/or has not been sufficient. Resistance to bending of the wiper lever can be increased by the cover striking against the drive shaft and/or the underlying surface in addition to striking against the wiper lever to avoid plastic deformation of the wiper lever.

The cover may have a side cover designed as an extension of the wiper lever, and the side cover may form the limit stop. The side cover can be spaced apart to a maximum extent from the elastically bendable part of the wiper lever. Thus, by virtue of the associated leverage, the side cover forms that part of the cover that performs a maximum movement relative to a fixed component during bending of the wiper lever. In particular, the side cover can gently strike a rearwardly projecting rear region of the wiper lever.

The mechanical stress on the wiper lever at the maximum bending angle is below the yield point $R_e$, in particular the lower yield point, in particular below 90% of $R_e$, and/or below the 0.2% proof stress $R_{p\ 0.2}$, in particular below 90% of $R_{p\ 0.2}$. Such a stress avoids plastic deformation of the wiper lever when the maximum bending angle is reached.

The wiper blade may be connected in a longitudinally movable manner to the wiper lever. Thus, when a force is introduced via the wiper blade to bend out the wiper lever, the wiper lever can be subjected only to elastic deformation at the maximum bending angle in any position of the wiper blade relative to the wiper lever. In this case, allowance can be made for the fact that the wiper blade, which may project beyond the longitudinal extent of the wiper lever, can be gripped to bend the wiper blade out. The possibility of longitudinal movement may cause the force introduced via the wiper blade to be introduced into the wiper lever at different points along the length of the wiper lever. Plastic deformation of the wiper lever is avoided by designing for the least favorable load case. Thus, plastic deformation of the wiper lever is avoided for all possible positions of the wiper blade relative to the wiper lever, and a load case that could allow plastic deformation of the wiper lever is avoided.

The invention further relates to a wiper arrangement having an underlying surface formed by a motor vehicle body. At least part of the underlying surface is formed by a window pane. The above-described wiper is coupled to the underlying surface. The limit stop in the wiper can keep the deformation of the wiper lever reliably in the range of elastic deformation, thus reducing the risk of damage to wipers.

An embodiment of the invention is explained below with reference to the attached drawing. The features explained below can each form one aspect of the invention either individually or in combination.

BRIEF DESCRIPTION OF DRAWINGS

FIG. 1 shows a schematic section through a wiper arrangement.

DETAILED DESCRIPTION

The wiper arrangement 10 illustrated in FIG. 1 has a window pane 12, in particular a rear window pane, of a motor vehicle, that can be wiped with the aid of a wiper 14. The wiper 14 has a drive shaft 16 that can be driven by a motor, and a wiper lever 18 is connected firmly to the drive shaft 16. A wiper blade (not shown) can be secured to the wiper lever 18, in a manner that allows movement along the wiper lever 18. The wiper lever 18 can be bent elastically away from the window pane 12 along a bending angle 20, in particular around a bending axis extending perpendicular to the drive shaft 16. In the state in which it is not bent out, the wiper lever 18 can press the wiper blade against the window pane 12 with a preload.

A cover 26 is secured by a fastening means 24 to a bending region 22 of the wiper lever 18. The bending region 22 can be bent out along the bending angle 20. The wiper lever 18 has a rear region 28 that faces away from the wiper blade and is not bent conjointly when the bending region 22 is bent. This rear region 28 projects from the drive shaft 16. The cover 26 has a side cover 30 that extends opposite the rear region 28 and forms a limit stop 32 that can strike against a counterstop 34 when a maximum bending angle 20 is reached. The counterstop 34 is formed by the narrow side of the rear region 28 of the wiper lever 18 and can block or hinder further bending. A distance between the limit stop 32 and the counterstop 34 is dimensioned so that, the limit stop 32 strikes against the counterstop 34 when the maximum bending angle 20 is reached to avoid plastic deformation of the wiper lever 18.

What is claimed is:

1. A wiper for wiping a window pane of a motor vehicle, the wiper having a drive shaft that can be driven by a motor, and a wiper lever connected to the drive shaft for moving a wiper blade, the wiper lever being flexibly bendable,
 wherein a maximum bending angle of the wiper lever around a bending axis extending perpendicular to the drive shaft is limited by a limit stop to bending of the wiper lever in a range of elastic deformation, and a counterstop projecting from the drive shaft on a rear region of the wiper lever facing away from the wiper blade and configured to engage the limit stop.

2. The wiper of claim 1, further comprising a cover connected to the wiper lever and covering the wiper lever, wherein the cover forms the limit stop.

3. The wiper of claim 2, wherein the cover is secured on a bending region of the wiper lever that can be bent out elastically.

4. The wiper of claim 2, wherein the limit stop of the cover is configured to make stop contact with the drive shaft and/or an underlying surface.

5. The wiper of claim 2, wherein the rear region of the wiper lever is an extension of the wiper lever from the drive shaft, and wherein the cover has a side cover opposed to the rear region of the wiper lever and opposed to the drive shaft, the side cover forms the limit stop.

6. The wiper of claim 1, wherein mechanical stress on the wiper lever at the maximum bending angle is below a yield point $R_e$ and below 0.2% proof stress $R_{p\ 0.2}$.

7. The wiper of claim 1, wherein the wiper blade is longitudinally movable on the wiper lever, and wherein, when a force is introduced via the wiper blade to bend out the wiper lever, the wiper lever can be subjected only to elastic deformation at the maximum bending angle in any position of the wiper blade relative to the wiper lever.

8. A wiper arrangement having an underlying surface formed by a motor vehicle body, wherein at least part of the underlying surface is formed by a window pane, and having the wiper of claim 1 coupled to the underlying surface for wiping the window pane.

9. A wiper for wiping a window pane of a motor vehicle, the wiper having a drive shaft that can be driven by a motor, and a wiper lever connected to the drive shaft for moving a wiper blade, the wiper lever being flexibly bendable, a cover connected to the wiper lever and covering the wiper lever,
 wherein a maximum bending angle of the wiper lever around a bending axis extending perpendicular to the drive shaft is limited by a limit stop formed on the cover to limit bending of the wiper lever in a range of elastic deformation, and the limit stop of the cover is configured to make stop contact with a region of the wiper lever that does not bend.

10. The wiper of claim 9, further comprising a counterstop projecting from the drive shaft on a rear region of the wiper lever facing away from the wiper blade and configured to engage the limit stop.

* * * * *